(12) United States Patent
Mehra et al.

(10) Patent No.: US 8,255,641 B2
(45) Date of Patent: Aug. 28, 2012

(54) MODIFYING DELETE NOTIFICATIONS IN A STORAGE STACK

(75) Inventors: Karan Mehra, Sammamish, WA (US); Darren G. Moss, Redmond, WA (US); William Tipton, Seattle, WA (US); Gregory J. Jacklin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 910 days.

(21) Appl. No.: 12/273,279

(22) Filed: Nov. 18, 2008

(65) Prior Publication Data
US 2010/0125588 A1 May 20, 2010

(51) Int. Cl.
*G06F 12/06* (2006.01)
*G06F 12/16* (2006.01)
(52) U.S. Cl. .................. 711/154; 711/161; 711/E12.103
(58) Field of Classification Search .................. 711/154, 711/161, E12.103
See application file for complete search history.

(56) References Cited

U.S. PATENT DOCUMENTS

| | | | |
|---|---|---|---|
| 6,067,541 A | 5/2000 | Raju et al. | |
| 6,185,574 B1 | 2/2001 | Howard et al. | |
| 6,507,911 B1 | 1/2003 | Langford | |
| 6,577,806 B1 | 6/2003 | Hirota | |
| 6,950,833 B2 | 9/2005 | Costello et al. | |
| 7,293,133 B1 | 11/2007 | Colgrove et al. | |
| 7,350,041 B1 | 3/2008 | Armangau et al. | |
| 7,634,507 B2 | 12/2009 | Atluri et al. | |
| 8,028,135 B1* | 9/2011 | Manley et al. ................. 711/161 |
| 2003/0130986 A1* | 7/2003 | Tamer et al. ........................ 707/1 |
| 2003/0144990 A1 | 7/2003 | Benelisha et al. | |
| 2005/0246382 A1 | 11/2005 | Edwards | |
| 2005/0246612 A1 | 11/2005 | Leis et al. | |
| 2006/0026263 A1 | 2/2006 | Raghavan et al. | |
| 2006/0041718 A1 | 2/2006 | Ulrich et al. | |
| 2006/0136446 A1 | 6/2006 | Hughes et al. | |
| 2006/0282630 A1* | 12/2006 | Hochberg et al. ............. 711/160 |
| 2007/0136551 A1* | 6/2007 | Leis et al. ..................... 711/173 |
| 2007/0174356 A1 | 7/2007 | Horii et al. | |
| 2007/0174850 A1* | 7/2007 | El Zur ........................... 719/321 |
| 2008/0022061 A1 | 1/2008 | Ito et al. | |
| 2008/0059542 A1 | 3/2008 | Atluri et al. | |
| 2008/0177805 A1* | 7/2008 | Kushwah et al. ............. 707/203 |
| 2008/0263305 A1 | 10/2008 | Shu et al. | |
| 2009/0055607 A1* | 2/2009 | Schack et al. .................. 711/162 |
| 2010/0115586 A1 | 5/2010 | Raghavan et al. | |

OTHER PUBLICATIONS

"Adapters in the Mainframe Connectivity Suite User Guide", IBM, IBM WebSphere Business Integration Adapters, Adapter Version 2.2.x, Apr. 18, 2003, 186 pages.

Shu, et al., "Data Set Management Commands Proposal Rev. 3", Oct. 5, 2007, pp. 1-9.

Shu, et al., "Data Set Management Commands Proposal for ATA8-ACS2", Revision 6, Dec. 12, 2007, pp. 1-7.

(Continued)

*Primary Examiner* — Hal Schnee
(74) *Attorney, Agent, or Firm* — Jared S. Goff

(57) ABSTRACT

A filter between a filesystem and a storage device in a storage stack can be configured to modify a delete notification, such as by modifying an existing delete notification or creating a new delete notification. A storage stack filter can receive an existing delete notification and determine a modified range of deleted data in response to receiving the existing notification, where a modified delete notification indicates the modified range of deleted data. A new delete notification can be created with a storage stack filter positioned below a filesystem in a storage stack, where the new delete notification indicates a range of deleted data. The new or modified delete notification can be passed down the storage stack.

19 Claims, 11 Drawing Sheets

OTHER PUBLICATIONS

"How Dynamic Disks and Volumes Work", Updated: Mar. 28, 2003. Copyright 2008 Microsoft Corporation. Webpage Available at: http://technet.microsoft.com/en-us/library/cc758035(printer).aspx.

Naik, "Techniques to Create a Volume Snapshot in Windows", Apr. 11, 2005. Article available on: http://searchwindowsserver.techtarget.com/tip/0,289483,sid68_gci1076693,00.html.

John H. Howard, "An Overview of the Andrew File System", 10 pages, Aug. 20, 2003, available at http://reports-archive.adm.cs.cmu.edu/anon/.

Anderson, et al., "Failure-Atomic File Access in an Interposed Network Storage System", In Proceedings of the Ninth IEEE International Symposium on High Performance Distributed Computing, 2000, 10 pages.

Kubiatowicz, et al., "OceanStore An Architecture for Global-Scale Persistent Storage", ASPLOS 2000, pp. 1-12.

Ames, et al., "Richer File System Metadata Using Links and Attributes", Proceedings of the 22nd IEEE/13th NASA Goddard Conference on Mass Storage Systems and Technologies (MSST 2005), 2005, IEEE, 12 pages.

Mehra, et al., "Using Delete Notifications to Free Related Storage Resources", U.S. Appl. No. 12/273,154, filed Nov. 18, 2008, pp. 1-37 & Drawing Sheets 1-11.

Mehra, et al., "Delete Notifications for an Entire Storage Volume", U.S. Appl. No. 12/273,358, filed Nov. 18, 2008, pp. 1-39 & Drawing Sheets 1-11.

Office Action in "Using Delete Notifications to Free Related Storage Resources", U.S. Appl. No. 12/273,154, Notification Date: Mar. 24, 2011, pp. 12.

Notice of Allowance in "Using Delete Notifications to Free Related Storage Resources", U.S. Appl. No. 12/273,154, Date Mailed: Sep. 19, 2011, pp. 5.

Office Action in "Delete Notifications for an Entire Storage Volume", U.S. Appl. No. 12/273,358, Notification Date: Aug. 24, 2011, pp. 9.

Office Action in "Using Delete Notifications to Free Related Storage Resources", U.S. Appl. No. 12/273,154, Notification Date: Dec. 12, 2011, pp. 6.

* cited by examiner

MODIFYING DELETE NOTIFICATIONS IN A STORAGE STACK

BACKGROUND

In computer systems, a storage sub-system may include a storage stack that includes multiple hardware and software components. For example, a typical stack may include a filesystem as a top component in the stack, one or more storage devices as bottom component(s) of the stack, and one or more filters between the filesystem and the storage device(s). Storage areas may be represented differently at different levels of the storage stack. For example, a storage stack may include a storage device stack that represents storage areas in terms of storage device addresses (e.g., using logical block addressing or cylinder-head-sector addressing), whether the storage devices are disks or other types of storage devices. On top of the storage device stack, the storage stack may include a volume stack that represents storage areas in terms of locations in one or more logical disks or volumes. A volume may cover a portion of a storage device, all of a storage device, or all or part of multiple storage devices.

Filters within the storage stack can provide added functionality. For example, a snapshot filter can manage snapshots of a volume. As another example, a write aggregation filter can aggregate data to be written to primary locations in one or more storage devices in a set of lazy writes (i.e., writes that are delayed until an idle or less busy time). As another example, the stack may include a disk verification filter that produces checksums of data as the data is written to a storage device. The disk verification filter can also compare those checksums with checksums of the same data as the data is read from the device, thereby verifying the integrity of the data being read. As yet another example, the stack may include a performance-boosting filter that caches data on some alternative storage media, such as RAM, a USB storage device, or flash media, that is faster than a main storage media. That cached data can be used to enhance computer performance, such as to more quickly boot a computer system.

File deletion happens frequently in computer systems. Operating system processes, such as formatting, defragmentation, recycling, temporary file deletion, and paging can produce a considerable amount of deleted file data. However, the information identifying deleted files is typically kept in the filesystem, and is not communicated to a storage device that stores the deleted file. As a result, the storage device treats both valid data and invalid data (data considered deleted by the filesystem) in its storage media the same way. Thus, the device performs all necessary operations to maintain the data, even if the data is considered invalid by the filesystem. For example, background defect management and error recovery processes may be used for hard disk drives. Merge, wear leveling and erase may be applied to solid state devices.

It has been known to send delete notifications, or trim commands, from a filesystem to a storage device to inform the storage device that particular blocks or ranges of data have been "deleted" (i.e., the blocks or ranges are now considered to be invalid data). Using this information, storage devices may be able to reduce internal operations on invalid data as a self-optimization. It has also been known to inform a storage driver when files are deleted. For example, handshake operations between a storage driver and a filesystem could involve the filesystem informing the storage driver when files get deleted, where the driver works with flash storage and does wear leveling operations for the storage. The driver could use such notifications to avoid read-modify-writes on deleted files.

SUMMARY

Whatever the advantages of previous tools and techniques, they have neither recognized the tools and techniques described herein for modifying delete notifications in a storage stack, nor the advantages produced by such tools and techniques.

In one embodiment, a filter between a filesystem and a storage device in a storage stack can be configured to modify a delete notification. In another embodiment, an existing delete notification can be received at a storage stack filter in a storage stack. The delete notification can indicate a range of deleted data. One or more modified ranges of deleted data can be determined in response to receiving the existing delete notification. If the one or more modified ranges of data include a range greater than zero, then one or more modified delete notifications can be passed down the storage stack. The one or more modified delete notifications can indicate the one or more modified ranges of data.

In yet another embodiment, a new delete notification can be created with a first storage stack filter that is positioned below a filesystem in a storage stack. The delete notification can indicate a range of deleted data. In addition, the new delete notification can be passed down the storage stack to a second storage stack filter.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
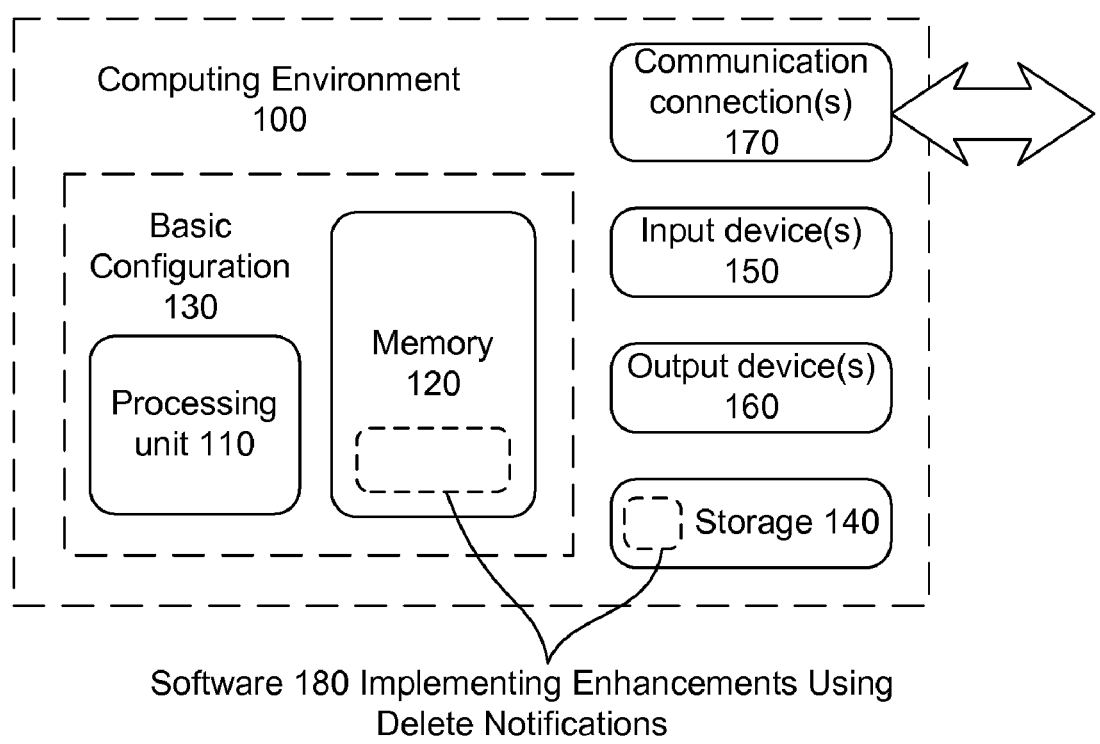
FIG. 1 is a block diagram of a suitable computing environment in which one or more of the described embodiments may be implemented.

Described embodiments are directed to techniques and tools for modifying delete notifications in a storage stack. Such improvements may result from the use of various techniques and tools separately or in combination.

Such techniques and tools may include modifying a delete notification with a storage stack filter that is positioned below a filesystem in a storage stack, and passing that delete notification down the storage stack. Modifying the delete notification can include creating a new notification or modifying one or more existing notifications (such as expanding or contracting a range indicated by an existing notification, deleting an existing notification by not passing the notification farther down the storage stack, or converting the notification from one space to another, such as from volume space (with volume-related ranges) to device space (with device-related ranges)). Thus, filters in the storage stack below the filesystem can modify delete notifications when it is beneficial to do so, such as when the modified delete notification can free system resources and/or improve performance.

For example, if a storage stack filter is protecting data stored in a protected region and a delete notification is for a delete region that overlaps with the protected region, then the filter can modify the delete region by contracting the region to exclude the protected region. Thus, the data in the protected region can remain unaltered in response to the modified delete notification.

As another example, a write aggregation filter in the storage stack may be operable to drain data from a log file to final storage destinations in lazy write operations. As the data is drained from the log file, the write aggregation filter may create new delete notifications for the drained areas of the log file and send those delete notifications down the storage stack.

In contrast with prior techniques where delete notifications were sent from the file system to one or more storage devices without modification, the tools and techniques described herein can allow storage stack filters below the filesystem to modify existing delete notifications and create new delete notifications when it appears beneficial to do so.

Accordingly, one or more substantial benefits can be realized from the tools and techniques described herein, such as freeing storage resources and protecting data that needs to be protected by one or more storage stack filters.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Techniques described herein with reference to flowcharts may be used with one or more of the systems described herein and/or with one or more other systems. Moreover, for the sake of simplicity, flowcharts may not show the various ways in which particular techniques can be used in conjunction with other techniques.

Exemplary Computing Environment

FIG. 1 illustrates a generalized example of a suitable computing environment (100) in which one or more of the described embodiments may be implemented. For example, one or more such computing environments can include a storage stack that implements enhancements using delete notifications. These enhancements could include, for example, using delete notifications that may apply to an entire storage volume, modifying delete notifications with filters in the storage stack, and/or using delete notifications to free related storage resources. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing enhancements using delete notifications.

Although the various blocks of FIGS. 1-17 are shown with lines for the sake of clarity, in reality, delineating various components and flowchart blocks is not so clear and, metaphorically, the lines would more accurately be grey and fuzzy. For example, one may consider a presentation component such as a display device to be an I/O component. In addition, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include solid-state storage devices, magnetic disks, magnetic tapes or cassettes, CD-ROMs, CD-RWs, DVDs, or any other medium which can be used to store information and which can be accessed within the computing environment (100). The storage (140) stores data, such as instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media. Computer-readable media are any available media that can be accessed within a computing environment. By way of example, and not limitation, with the computing environment (100), computer-readable media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "receive," "send," "pass," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

Delete Notification Enhancement System and Environment

A. Storage Stack in General

Figure 2:
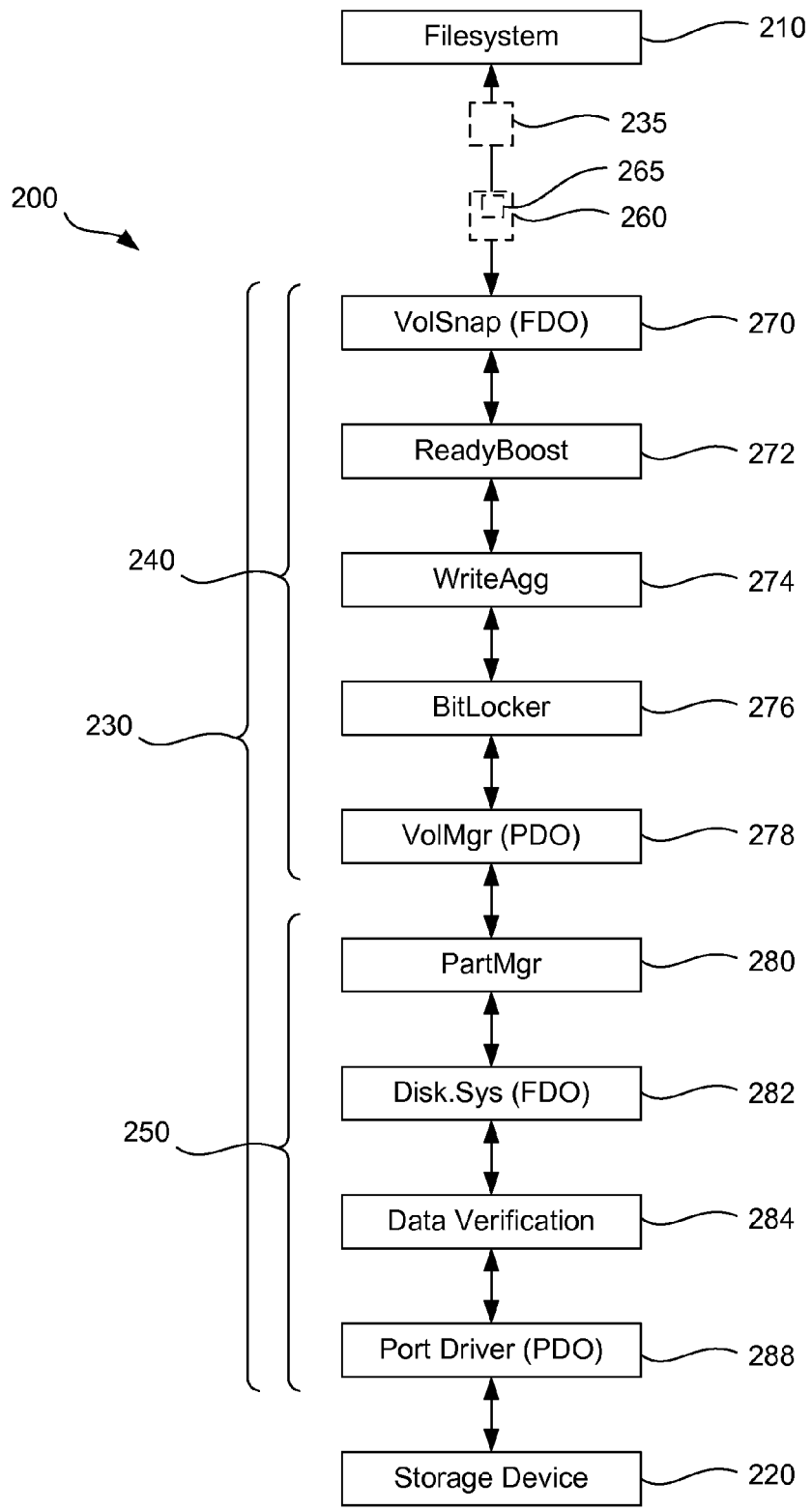
FIG. 2 is block diagram of a storage stack in which one or more of the described embodiments may be implemented.
Figure 3:
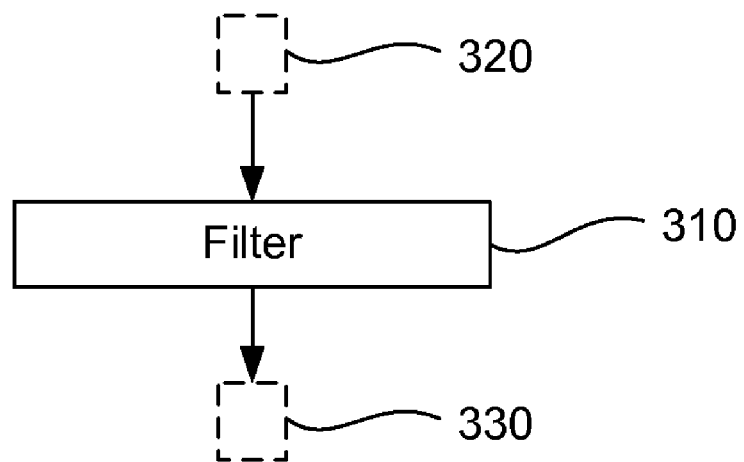
FIG. 3 is a block diagram illustrating a filter modifying an existing delete notification.
Figure 4:
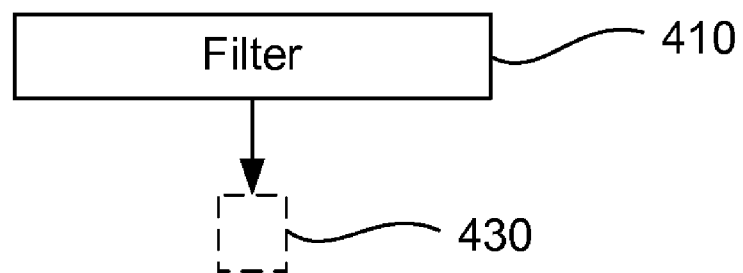
FIG. 4 is a block diagram illustrating a filter creating a new delete notification.

FIG. 2 is a block diagram of a storage stack (200) in conjunction with which one or more of the described embodiments may be implemented. The storage stack (200) can include software and/or hardware components. For example, the storage stack (200) can include a top-level filesystem (210) and a bottom level storage device (220), as well as storage stack filters (230) between the filesystem (210) and the storage device (220). The term storage stack filter is used herein to refer to any component between a filesystem and a physical storage medium in a storage device, where the component can receive and pass on read and/or write requests (235) and provide additional functionality. The storage stack (200) may include a logical disk functionality that represents storage units to the file system in terms of storage volumes, where each volume may represent a single storage device, part of one or more storage devices, or multiple storage devices. If so, then the storage stack can include a volume stack (240), which can provide this functionality, and can provide additional functionality. A device stack (250) can be positioned below the volume stack, and can represent storage positions to the volume stack (240) in terms of positions within the storage device (220). The storage device (220) can also be considered to be part of the storage stack (200).

The storage stack (200) could be configured in other ways in other implementations. For example, in some implementations volumes always coincide with storage devices, such as in a basic disk configuration. In such a configuration, the storage stack (200) may not need to convert storage positions between volume space and device space. On one implementation, the filesystem (210), the volume stack (240), and the device stack (250) are all part of an operating system. However, the storage stack (200) could be configured in some other manner. For example, some of the storage stack (200) could be included in a storage device itself. As another example, the storage stack could include program modules that are part of applications other than an operating system. Moreover, there could be one or many filesystems, disk and/or volume stacks and devices interacting with each other in the storage stack.

As an example of how storage positions can be represented in the different layers of the storage stack (200), consider a situation where a 50-megabyte file is written to a storage device. The filesystem (210) can receive a request (235) to write the file, such as from an application, an operating system service, and/or user input. The filesystem (210) can then determine an appropriate position in the volume to store the file. To do this, a filesystem (210) typically tracks occupied space that contains valid data, which the filesystem (210) may need to retrieve at some point. The filesystem (210) also typically tracks free space that contains invalid data, where either no data has been stored by the operating system or where data has been deleted (i.e., de-allocated) by the filesystem (210). In one implementation, the filesystem (210) can maintain a freespace bitmap file that can represent free space in a storage volume as 1's and occupied space in a storage volume as 0's. If megabytes 974 through 1024 of the volume are freespace in the freespace bitmap file, then the filesystem (210) can pass a write request (235) down the storage stack (200) with the data for the file to be written, specifying that the data-to-be-written is to be stored in megabytes 974 through 1024 of the volume. That request (235) can be passed down the volume stack (240) and the volume stack (240) can convert the request (235) from volume space to device space.

For example, if a volume spans two storage devices, including one gigabyte of a first device (megabytes 0 through 999 of the volume) and one gigabyte of a second device (megabytes 1000 through 1999), then the volume stack could split the request into two write requests: one to write the first 25 megabytes of the file on megabytes 975 to 999 of the first device and one to write the last 25 megabytes of the file on megabytes 0 to 24 of the second device. That request can then be passed down the device stack (250) and to the storage device (220). Of course, the storage device (220) can include its own internal stack of software and hardware components (such as additional storage stack filters) that can be part of the storage stack (200), and the device (220) may include several physical storage mediums (e.g., several disks within a disk drive).

The filesystem can "delete" a file by switching occupied space corresponding to the file to freespace, such as in the freespace bitmap. As noted above, this filesystem deletion can be done without notifying the storage device (220) or the other components of the storage stack (200). However, it can be advantageous to send a delete notification (260) down the storage stack (200) when the filesystem (210) deletes a file. This notification (260) can specify a region of the volume that the filesystem (210) has deleted (i.e., switched to freespace). The storage device (220) can use this notification to provide improved internal performance and efficiencies, such as by ceasing to maintain the invalid data in the specified region.

The storage stack filters (230) of the storage stack (200) can also use such delete notifications to provide additional enhancements. For example, storage stack filters (230) in the storage stack (200) can modify delete notifications to exclude data being protected by those filters (230). For example, referring to FIG. 3, a filter (310) can receive and modify one or more existing delete notifications (320) to produce one or more modified delete notifications (330). Referring back to FIG. 2, as another example, storage stack filters (230) can modify delete notifications (260) to notify lower level storage stack components, including the storage device (220), that data has been deleted (i.e., de-allocated). As another example of modifying a delete notification, referring to FIG. 4, a filter (410) can create a new delete notification (430). This can either be done directly by the filter (410), or indirectly by the filter (410) instructing some other software or hardware component to create the new delete notification (430).

Referring back to FIG. 2, as another example of an enhancement using a delete notification, filters (230) can use a delete notification (260) to identify storage resources that are not needed and can be freed. As yet another example, the delete notification (260) can include a flag (265) indicating whether the notification (260) applies to an entire volume, and one or more of the filters (230) can react differently to the notification (260) when the notification (260) applies to the entire volume.

B. Storage Stack Components

Referring still to FIG. 2, some exemplary components of the storage stack (200) will be described. As is indicated by the vertical lines with arrow tips between the components in FIG. 2, each component can be configured to communicate with the component directly above it and directly below it in the storage stack (200). The components may also include interfaces, such as user interfaces, to send and receive instructions and other communications between the component and other software or hardware components inside or outside the storage stack (200). The volume stack (240) can include, from top to bottom, a snapshot filter (270) (below the filesystem (210)), a performance-boosting filter (272), a write aggregation filter (274), an encryption filter (276), and a volume manager filter (278). The device stack (250) can include, from top to bottom, a partition manager filter (280) (below the volume manager filter (278)), a device stack functional device object (282), a data verification filter (284), and port driver (288) (above the storage device (220)). However, the storage stack (200) could include fewer components, additional components, and/or components that behave differently or are positioned elsewhere in the storage stack (200).

1. Snapshot Filter

The snapshot filter (270) can manage volume snapshots, and can also function as a functional device object (FDO) for the volume stack (240). The FDO for the volume stack (240) can provide the functionality for the volume. Filters below the FDO but above a physical device object (PDO) in a stack are typically considered lower level filters, while filters above the FDO in a stack are typically considered upper level filters. Managing volume snapshots can include taking snapshots of a storage volume at a particular point in time. This allows users and/or programs to go back in time to the storage volume as the volume existed when the snapshot was taken.

Figure 5:
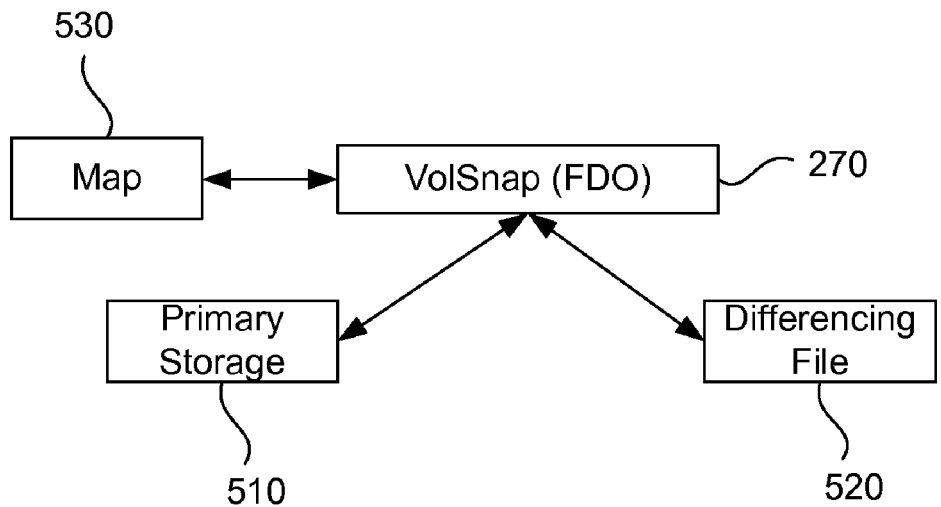
FIG. 5 is a block diagram illustrating operation of an exemplary snapshot filter that can implement one or more of the described tools and techniques.

Managing snapshots could be done by making a copy of an entire volume at a point in time and not allowing any modifications to that copy. Referring to FIGS. 2 and 5, it is typically more efficient to maintain snapshots by only copying those regions of the primary storage volume (510) where changes have taken place since the time of the snapshot. These copies of the modified regions can be saved in one or more differencing files (520). According to this technique, if a region of primary data that is subject to a snapshot has not yet been copied, then such a region and the primary data stored in the region can be protected by the snapshot filter (270).

If the snapshot filter (270) receives a write request from the filesystem (210) to write data to a protected region, then the snapshot filter (270) can copy the data in the protected region of the primary storage (510) to the differencing file (520). Then, the data in the primary storage region (510) can be marked as unprotected, and the snapshot filter (270) can pass the write request down the storage stack (200). Thus, the snapshot filter (270) can maintain a copy of the data for an entire volume as the volume existed at the time of the snapshot, with some of the data being stored with the primary data (where the primary data has not been altered since the time of the snapshot) and some of the copy being stored in one or more differencing files (where the primary data has been altered since the time of the snapshot).

As noted, the snapshot filter (270) can include one or more maps (530) to track which regions of the primary storage region (510) are protected (because the regions are covered by a snapshot and have not yet been copied to a differencing file) and which are unprotected (because the regions are not covered by a snapshot or have been copied to a differencing file). For example, for each snapshot, the snapshot filter (270) can maintain a bitmap (530) showing which regions are protected or unprotected by that snapshot, such as with 1's representing unprotected regions and 0's representing protected regions for that snapshot. These bitmaps (530) can be examined to determine whether a region is protected and needs to be copied prior to data being written to the region.

When the snapshot filter (270) receives a delete notification (260), the snapshot filter (270) can determine whether a range of data that the delete notification indicates is being deleted overlaps with a range of protected primary data. If there is an overlap, then the snapshot filter (270) can copy the protected primary data to a differencing file (520) prior to passing the delete notification (260) down the storage stack (200). However, the copied data in the differencing file (520) takes up storage space, and the copy operation can also take up storage resources, including processing resources.

Accordingly, instead of copying the protected data that overlaps with the range of the delete notification (260), the snapshot filter (270) can modify the range of the existing delete notification (260) to exclude the portion of the range that overlaps with the protected data range. This could result in the modified delete notification having one contiguous contracted range or a contracted range that includes disconnected sub-ranges. The modified delete notification could be in the form of a single notification or multiple notifications. The modified delete notification with the contracted range can then be passed down the storage stack (200) to the performance-boosting filter (272).

As an example, if the existing delete notification (260) applies to a range of 100 megabytes to 200 megabytes of a volume, and a range of 50 megabytes to 150 megabytes of the volume is protected, then the snapshot filter (270) can modify the delete notification (260) to have a contracted range of 151 megabytes to 200 megabytes. As another example, if the existing delete notification (260) applies to a range of 100 megabytes to 200 megabytes of a volume, and ranges of 120 to 145 megabytes and from 160 to 165 megabytes of the volume are protected, then the snapshot filter (270) can modify the delete notification (260) to have a contracted range including sub-ranges of 100 to 119 megabytes, from 146 to 159 megabytes, and from 166 to 200 megabytes. The entire contracted range could be included in a single modified delete notification with sub-ranges or each sub-range could be included in a separate modified delete notification.

The modified delete notification(s) can be passed down the storage stack (200) to the performance-boosting filter (272). Thus, the protected data will not be modified in response to the delete notification (260), and the protected data will not need to be copied at that time. Similar techniques could be used by other storage stack filters that need to protect data that can be covered by a delete notification (260).

Snapshots may be deleted in some implementations. For example, snapshots may be deleted manually by a user, or automatically. For example, a user can configure the snapshot filter (270) so that the snapshot data (secondary data corresponding to the primary data at the time of the snapshot, such as the data in the differencing file(s) (520)) takes up only a certain percentage of the storage volume. For example, if a user specifies a maximum of fifteen percent, then as the amount of snapshot data approaches fifteen percent of the storage volume, the snapshot filter (270) can delete snapshots according to a scheme, such as deleting the oldest snapshots. At that time, the snapshot filter (270) can inform the filesystem (210) that differencing files (520) that were used only by the deleted snapshots contain invalid data and can be deleted. In response, the filesystem (210) can mark the storage regions of those differencing files (520) as invalid data and send delete notifications for those regions down the storage stack (200).

In addition, when a snapshot is deleted, the snapshot filter (270) can issue additional delete notifications for primary storage regions (510) that the snapshot filter (270) had omitted from previous delete notifications (260) because the notifications (260) indicated delete regions that overlapped with protected regions being protected by the snapshot filter (270). If those regions are no longer protected after the snapshot is deleted, then the snapshot filter (270) can send down the delete notifications for those regions. This can free up storage resources in the same manner as other delete notifications issued by the filesystem (210).

The snapshot filter (270) could identify these regions by tracking all regions where delete notifications (260) were withheld or modified by the snapshot filter (270) because the notifications (260) indicated ranges that overlapped with protected data. However, the snapshot filter (270) can compute regions that can be deleted in another manner, without tracking those regions. When a snapshot is deleted, the snapshot filter (270) can calculate the product of all the bitmaps (530) that track unprotected areas for active snapshots after the snapshot deletion. This produces an ignorable product bitmap that shows all storage regions that are unprotected by the snapshot filter (270) after the snapshot deletion, such as by having 1's for those regions. The snapshot filter (270) can also take the product of that ignorable product bitmap and the filesystem's freespace bitmap to produce a bitmap that shows areas that are considered freespace by the filesystem (210) and are unprotected by the snapshot filter (270), such as by having 1's corresponding to such areas. The snapshot filter (270) can create new delete notifications for all such areas and pass the new delete notifications down the storage stack (200) to the performance-boosting filter (272).

If the snapshot filter (270) receives a delete notification (260) with a flag (265) indicating that the delete notification (260) applies to the entire volume, then the snapshot filter (270) can react differently than it would to a delete notification (260) that applies to less than the entire volume. For example, if the snapshot filter (270) receives a delete notification (260) with a flag (265) indicating that the delete notification (260) applies to the entire volume, then the snapshot filter (270) can delete all snapshots for the volume, and the snapshot filter (270) can disable itself. The snapshot filter (270) can continue to be disabled until it is re-enabled, such as by a user or another computing component. For example, the snapshot filter (270) may be re-enabled the next time a snapshot is created automatically or in response to user input.

2. Performance Boosting Filter

Figure 6:
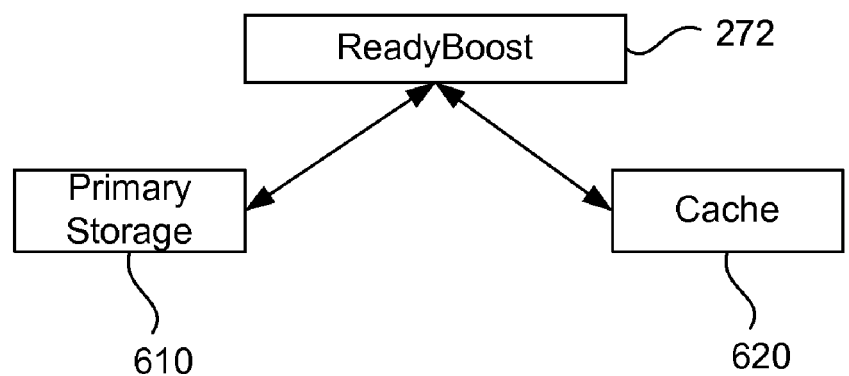
FIG. 6 is a block diagram illustrating operation of an exemplary performance-boosting filter that can implement one or more of the described tools and techniques.

Referring to FIGS. 2 and 6, the performance-boosting filter (272) can communicate with the snapshot filter (270) above it and the write aggregation filter (274) below it to receive and pass on delete notifications (260) and read/write requests and data (235). In addition, the performance boosting filter can copy parts of a primary storage region (610) into a cache (620) on some other media that is faster than the primary storage device (e.g., the other media may be RAM, USB drive, or flash media if the primary storage volume is on one or more hard disks). The data can be read from the cache (620) instead of the primary storage (610) to enhance system performance. For example, the stored data may be instructions that are used when booting a computer system, thereby speeding the boot process.

The performance-boosting filter (272) could pass on delete notifications (260) without taking other actions. If a delete notification (260) applies to a region of primary storage (610) that corresponds to the cache (620), then the cache (620) can get out of sync with the primary data. That would likely not affect the integrity of the cache data because there would be no reason for the cache data corresponding to the deleted primary data to be read in the future. However, space in the cache (620) is often quite limited, especially in the types of faster media mentioned above. For example, in some implementations the cache (620) may be limited to about 300 megabytes. Thus, it can be advantageous for the performance-boosting filter (272) to determine whether data in the cache (620) corresponds to data in primary storage (610) covered by a delete notification (260), and if so the performance-boosting filter (272) can delete the corresponding cache data. This can include the performance-boosting filter (272) issuing a delete notification for the cached data or merely marking the deleted region of the cache as invalid so that more cached data can be stored in the region. In addition to freeing up resources, such deletions can be beneficial if the cache (620) needs to be matched to the corresponding areas of the primary storage (610).

If the performance-boosting filter (272) receives a delete notification (260) with a flag (265) indicating that the delete notification (260) applies to the entire volume, then the performance-boosting filter (272) can react differently than it would to a delete notification (260) that applies to less than the entire volume. For example, if the performance-boosting filter (272) receives a delete notification (260) with a flag (265) indicating that the delete notification (260) applies to the entire volume, the performance-boosting filter (272) can disable itself, or it can remain enabled, but start caching operations from scratch. If the performance-boosting filter (272) is disabled, it may remain disabled for a set period of time or until it is re-enabled by an action of another program and/or user input.

3. Write Aggregation Filter

The write aggregation filter (274) can communicate with the performance-boosting filter (272) above it and the encryption filter (276) below it to receive and pass on delete notifications (260) and read/write requests and data (235). In addition, the write aggregation filter (274) can provide the additional functionality of managing write aggregation and lazy writes of aggregated write requests. When data is written to primary storage (710) on the storage device (220), the write operation may involve making updates in several different primary data locations in the volume. Instead of always writing data-to-be-written to the primary storage locations at the time the requests are made, the write aggregation filter (274) can write the data-to-be-written to one or more log files (720). The write aggregation filter (274) can also update an in-memory map (730), which can be a table that correlates the primary locations of the data-to-be-written with the positions of the data-to-be-written in the log file. The log file (720) can be stored in the same volume as the primary storage (710) or elsewhere. The data-to-be-written can be drained from the log file (720) to the primary location(s) in the primary storage (710) in lazy write operations, which can be done at idle times, when the storage device (220) would otherwise be idle. The in-memory map (730) can be examined to determine which drain operations still need to be done. After data is drained from the log file (720), entries in the in-memory map (730) that correspond to the drained data can be removed.

If read requests for locations of the data-to-be-written in primary storage (710) come down the storage stack (200) before data-to-be-written is drained from the log file (720), the write aggregation filter (274) can use the in-memory map (730) to redirect the requests to the appropriate places in the log file (720). After the data-to-be-written is drained to its primary locations in primary storage (710), the write aggregation filter (274) can allow read requests for that data to be passed down the stack unmodified.

Referring to FIGS. 7-10, the log file (720) can be a circular file, where a log file storage region (800) is allocated for the log file (720). Data-to-be-written can be added to the log file (720), which moves through the storage region (800) as data-to-be-written is added to and drained from the log file (720). Specifically, data-to-be written can be added to a "head" (820) of the log file (720) when write requests are made during busy times, and the data-to-be-written can be drained from a "tail" (830) of the log file (720) when lazy writes are made, such as at idle times. When the head (820) reaches the end of the storage region (800), data can continue to be written at the beginning of the storage region (800), so long as the beginning has been drained. In this way, the log file (720) can travel a "circular" path through the storage region (800). As data is added to the head (820) or drained from the tail (830), the in-memory map (730) can be updated.

As an example, the log file storage region (800) may be 5 gigabytes. Initially, data-to-be-written can be added to the log file (720), along with corresponding metadata describing the primary locations for the data-to-be-written, starting at a 0 byte marker and continuing toward a 5 GB marker. For example, 2 gigabytes may be added, so that the log file (720) extends from the 0 byte marker to the 2 gigabyte marker, and an unused area (812) extends from the 2 gigabyte marker to the 5 gigabyte marker, as is illustrated schematically in FIG. 8.

Figure 9:
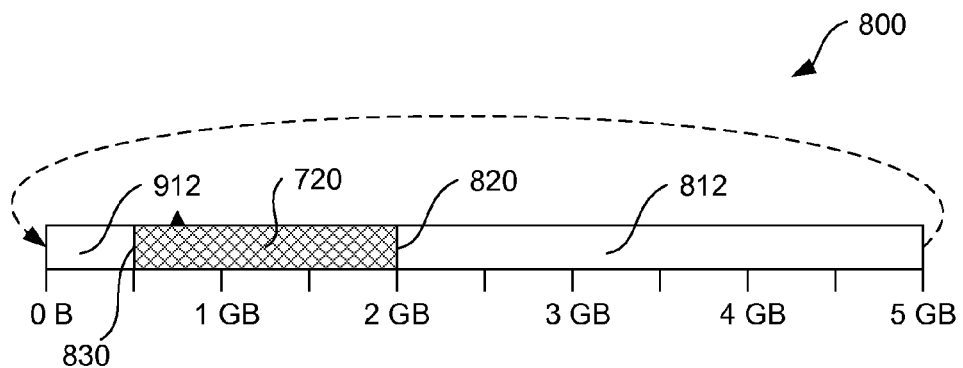
Figure 10:
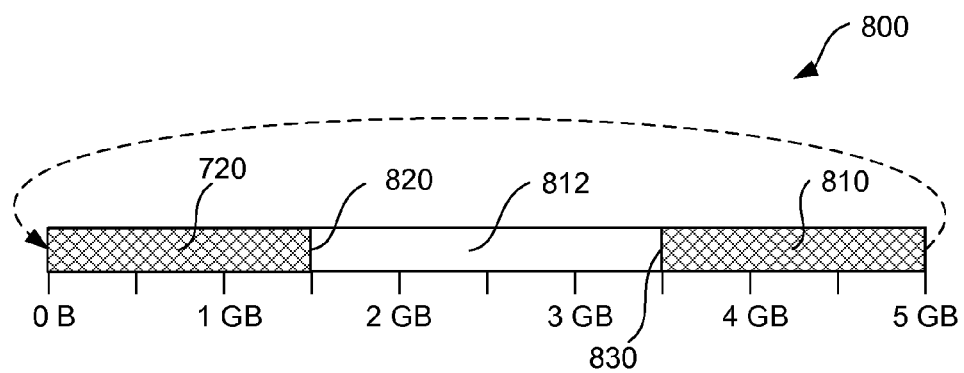

At idle time, some of the data-to-be-written may be drained from the tail (830) of the log file (720). For example, 500 megabytes may be drained so that the tail (830) moves forward to the 500 megabyte marker, leaving an additional unused area (912) (that is also part of the unused area (812)), as illustrated in FIG. 9.

Adding and draining data can continue until the head wraps around to the beginning of the log file storage region (800). This is illustrated schematically in FIG. 10, where the tail (830) has moved forward to the 3.5 gigabyte marker and the head (820) has moved forward to the 1.5 gigabyte marker. Accordingly, the log file (720) begins at the tail (830) and wraps around to the head (820), leaving an unused area from the 1.5 gigabyte marker to the 3.5 gigabyte marker.

Referring back to FIGS. 2 and 7, if the write aggregation filter (274) receives a delete notification (260), the write aggregation filter (274) can check the in-memory map (730) to determine whether the regions of the primary storage (710) covered by the delete notification (260) overlap with the primary locations of any corresponding data-to-be-written that is stored in the log file (720). If so, then those areas can be trimmed from the in-memory map (730), so that areas associated with the delete notification (260) will not be drained to the primary storage (710), and storage resources (storage device, processors that can be used for storage operations, etc.) can be freed for other uses.

In addition, referring to FIGS. 2 and 8-10, the write aggregation filter (274) may create new delete notifications that cover unused areas (812) of the log file storage region (800). For example, when the unused area (812) expands to include the additional unused storage area (912) between 0 bytes and 500 megabytes, the write aggregation filter (274) can issue a delete notification covering the additional unused storage area (912). This can provide for the same types of benefits as regular delete notifications, even though the filesystem (210) may view the unused storage area (812, 912) as containing valid data (because the unused storage area (812, 912) is in the storage region (800) that has been allocated for use by the write aggregation filter (274)). Thus, a storage device (220), such as a flash memory device, can prepare this additional unused storage area (912) for writing and can cease maintaining data that is stored in the additional unused storage area (912). This may increase the life and/or performance of the storage device (220), such as by decreasing the number of times that a flash memory needs to erase a particular storage block.

Figure 7:
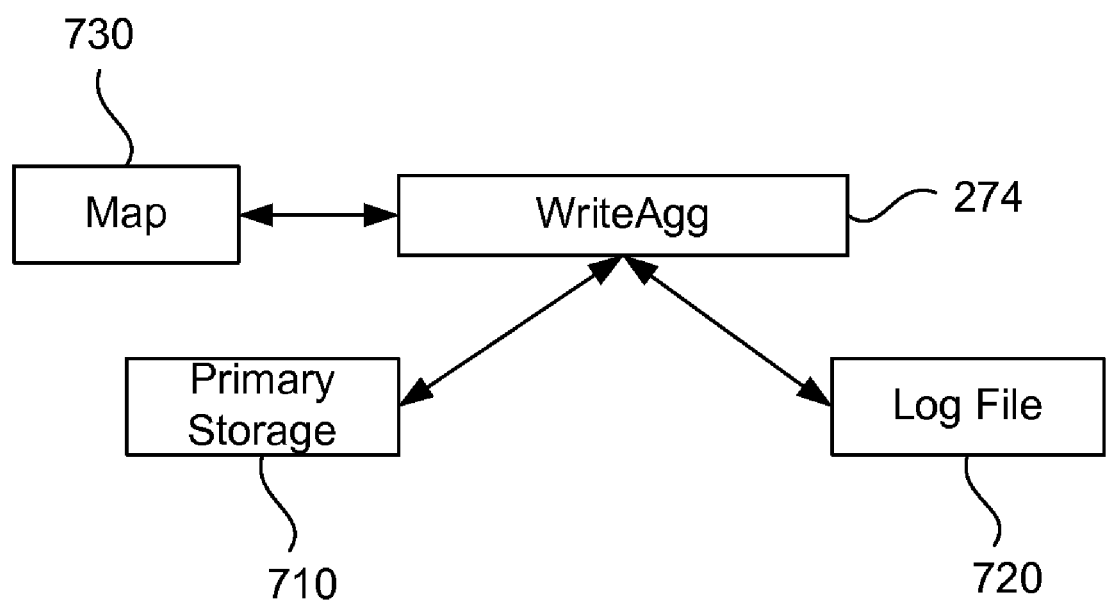
FIG. 7 is a block diagram illustrating operation of a write aggregation filter that can implement one or more of the described tools and techniques.
Figure 8:
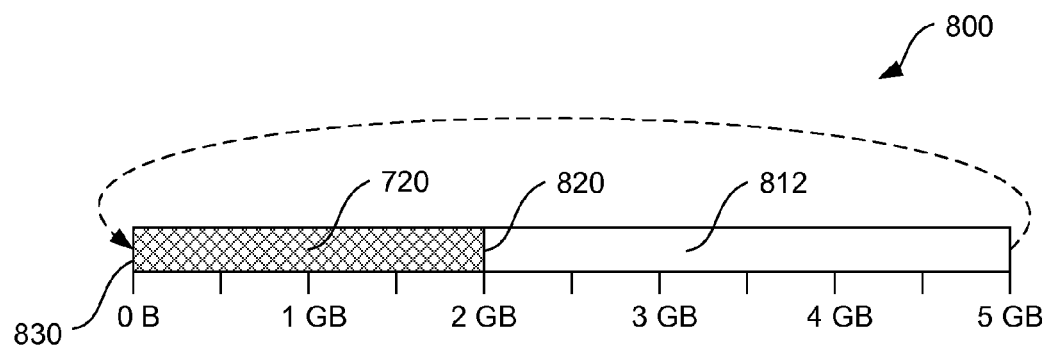
FIGS. 8-10 are block diagrams of circular log files that can be managed by the write aggregation filter of FIG. 7.

Referring to FIGS. 2, 5, and 7, the write aggregation filter (274) can have a special handshake operation with the snapshot filter (270). In this handshake, the snapshot filter (270) can request that the write aggregation filter (274) copy data from a protected primary storage area (510) to a differencing file (520). Instead of sending this request down the storage stack (200), the write aggregation filter (274) can notify the snapshot filter (270) that the copy operation was completed successfully. The write aggregation filter (274) can add the location in primary storage (510) and the location in the differencing file (520) to the write aggregation filter's in-memory map (730). The write aggregation filter (274) can then redirect any read requests for the differencing file location to the primary storage area location, using the in-memory map (730). If this is done, the write aggregation filter (274) can protect the data by modifying delete notifications to remove areas that overlap with copy protected areas that have not yet been copied. This can be done in a manner that is similar to the delete notification modifications done by the snapshot filter (270) to protect data, as discussed above.

If the write aggregation filter (274) receives a delete notification (260) with a flag (265) indicating that the delete notification (260) applies to the entire volume, then the write aggregation filter (274) can react differently than it would to a delete notification (260) that applies to less than the entire volume. For example, if the write aggregation filter (274) receives a delete notification (260) with a flag (265) indicating that the delete notification (260) applies to the entire volume, the write aggregation filter (274) can disable itself; or the write aggregation filter (274) can remain enabled, but cancel all ongoing draining operations and delete the log file (720). If the write aggregation filter (274) is disabled, it may remain disabled for a set period of time or until it is re-enabled by an action of another program and/or user input.

4. Encryption Filter

Referring to FIG. 2, the encryption filter (276) can communicate with the write aggregation filter (274) above it and the volume manager filter (278) below it to receive and pass on delete notifications (260) and read/write requests and data (235). The encryption filter (276) may also perform additional functions, such as encrypting an entire volume.

If the encryption filter (276) receives a delete notification (260) with a flag (265) indicating that the delete notification (260) applies to the entire volume, then the encryption filter (276) can react differently than it would to a delete notification (260) that applies to less than the entire volume. For example, if the encryption filter (276) receives a delete notification (260) with a flag (265) indicating that the delete notification (260) applies to the entire volume, the encryption filter (276) can disable itself; or the encryption filter (276) can remain enabled, but cancel all ongoing encryption operations. If the encryption filter (276) is disabled, it may remain disabled for a set period of time or until it is re-enabled by an action of another program and/or user input.

5. Volume Manager Filter

The volume manager filter (278) can communicate with the encryption filter (276) above it and the partition manager filter (280) in the device stack (250) below it to receive and pass on delete notifications (260) and read/write requests and data (235). The volume manager filter (278) can communicate with the appropriate device stack(s) (250) involved in the configuration, whether there are one or several such device stacks. In addition, the volume manager filter (278) can be the PDO for the volume stack (240). Before passing on delete notifications (260), the volume manager filter (278) can convert read/write requests (235) and delete notifications (260) between volume space and device space.

For example, in a striping configuration, megabytes 0 to 99 of a volume may correspond to megabytes 0 to 99 of a first storage device; megabytes 100 to 199 of the volume may correspond to megabytes 0 to 99 of a second storage device; megabytes 200 to 299 of the volume may correspond to 100 to 199 megabytes of the first device; megabytes 300 to 399 of the volume may correspond to megabytes 100 to 199 of the second storage device, and so forth. In this example, the volume manager filter (278) can split a delete notification that applies to megabytes 49 to 150 of the volume into one delete notification that applies to megabytes 49 to 99 of the first storage device and another delete notification that applies to megabytes 0 to 50 of the second storage device. Similar conversions can be done for other configurations, such as where a volume spans multiple storage devices, or where a volume takes up only part of a storage device. This conversion between volume and storage device space (i.e., from volume-relative range(s) to device-relative range(s)) is an example of modifying the delete notifications (260). As an example of this type of modification, consider a disk (0 to 99 megabytes) with two volumes on it, where volume 1 resides from 1 to 24 megabytes and volume 2 resides from 25 to 99 megabytes. If the volume manager filter (278) receives a delete notification for range 10 to 14 megabytes on volume 1, it can adjust that range to 11 to 15 megabytes, and if the volume manager filter (278) receives the same delete notification on volume 2 (a notification for 10 to 14 megabytes on volume 2), it can adjust that range to 35 to 39 megabytes.

Figure 11:
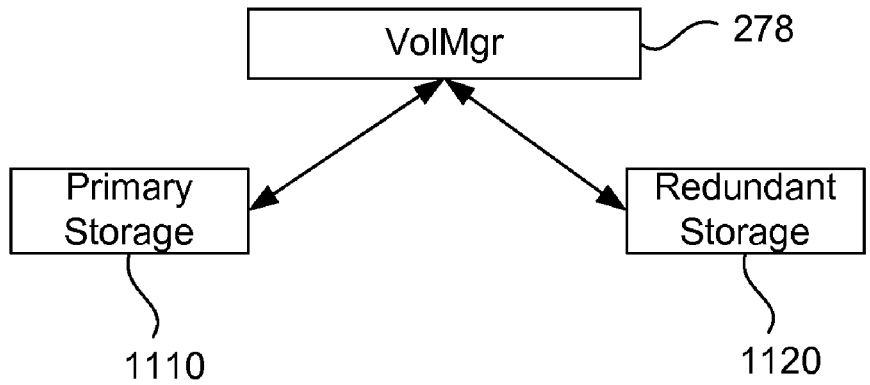
FIG. 11 is a block diagram illustrating operation of a volume manager filter that can implement one or more of the described tools and techniques.

Referring to FIG. 11, in many fault-tolerant volume storage configurations, in addition to maintaining a primary storage volume (1110), the volume manager filter (278) can maintain redundant storage (1120), which may be used to recreate part or all of the primary storage volume (1110) in the case of storage device failure. For example, this can be done with some types of redundant arrays of independent disks (RAID), such as mirroring or RAID 5. In the case of mirroring, the redundant storage (1120) includes a copy (mirror image) of a primary storage volume (1110). The redundant storage (1120) can be created and maintained on one or more separate storage devices. In the case of RAID 5, at least three "plexes" can be used, where a plex is typically a set of one or more storage devices. One of the plexes (the redundant storage (1120)) can be an XOR of all the other plexes (the primary storage (1110)). If one of the primary storage plexes crashes, the plex can be recreated using the remaining primary storage plexes and the redundant XOR plex.

The redundant storage (1120), such as a RAID 5 XOR plex or a mirror image, sometimes needs to be synchronized with the primary storage volume (1110). For example, synchronization is typically done when a RAID 5 XOR plex or a mirror image is first created, or after system failure, such as a dirty shutdown. Synchronization can involve the volume manager filter (278) examining the primary storage volume (1110), comparing the primary storage volume (1110) to the redundant storage (1120), performing any necessary calculations, and writing any necessary data to synchronize the redundant storage (1120) with the primary storage (1110). With mirroring synchronization could include performing a series of read and copy operations; and with RAID 5, synchronization could include read and write operations, as well as XOR calculations.

Referring to FIGS. 2 and 11, when the volume manager filter (278) is performing a synchronization operation with primary storage (1110) and redundant storage (1120), the volume manager (278) can omit from its synchronization operations those areas of primary storage (1110) that have been covered by delete notifications (260), unless subsequent write operations have been executed in those areas. This can be done whether the delete notifications (260) are received before the synchronization operation begins, or even while the synchronization operation is ongoing. By foregoing some of these synchronization operations, storage resources can be freed.

In addition, the volume manager filter (278) can modify an existing delete notification (260) by expanding a range of data covered by the existing delete notification (260) to cover not only the data in primary storage (1110) indicated by the existing delete notification (260), but also corresponding data in redundant storage (1120).

If the volume manager filter (278) receives a delete notification (260) with a flag (265) indicating that the delete notification (260) applies to the entire volume, then the volume manager filter (278) can react differently than it would to a delete notification (260) that applies to less than the entire volume. For example, if the volume manager filter (278) receives a delete notification (260) with a flag (265) indicating that the delete notification (260) applies to the entire volume, the volume manager filter (278) can remain enabled, but cancel all ongoing synchronization operations. When the volume manager filter (278) receives an existing delete notification (260) that applies to the entire storage volume, and this is indicated by a flag (265), the volume manager filter (278) can modify the delete notification (260) by replacing the flag (265) with one or more delete notifications for one or more device-relative ranges that span the entire volume before passing the modified delete notification(s) down the storage stack (200).

6. Partition Manager Filter

Referring to FIG. 2, the partition manager filter (280) can communicate with the volume manager filter (278) above it and the disk class driver (282) below it to receive and pass on delete notifications (260) and read/write requests and data (235). Thus, the partition manager filter (280) can be the upper-most filter in the device stack (250). In addition, the partition manager filter (280) can manage the partitions for the associated storage device (220). If a user wants to remove the partitions on the associated storage device (220), the partition manager filter (280) can create a new delete notification that applies to the entire storage device (220) and pass the new notification down the disk stack to the disk class driver (282).

7. Disk Class Driver

The disk class driver (282) can communicate with the partition manager filter (280) above it and the data verification filter (284) below it to receive and pass on delete notifications (260), as well as read/write requests and data (235). The disk class driver (282) can also be the FDO for the device stack (250). If the disk class driver (282) receives a delete notification that applies to the entire storage device (220), then the disk class driver (282) can treat that delete notification the same as other delete notifications because the disk class driver's operations do not involve caching or transforming data.

8. Data Verification Filter

Figure 12:
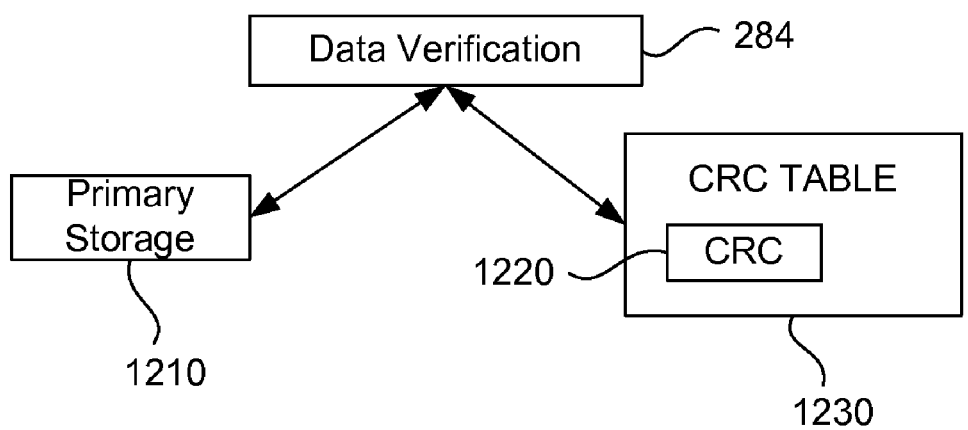
FIG. 12 is a block diagram illustrating operation of a data verification filter that can implement on or more of the described tools and techniques.

Referring now to FIGS. 2 and 12, the data verification filter (284) can communicate with the disk class driver (282) above it and the port driver (288) below it to receive and pass on delete notifications (260) and read/write requests and data (235). The data verification filter (284) can perform calculations on a block of data to be written to the primary storage (1210), and produce and store a cyclical redundancy check (CRC) (1220) from that data. The CRC's (1220) can be used as checksums to detect accidental alteration of data by the storage device (220). The CRC's (1220) can be stored in a CRC table (1230), which can be stored in memory, such as RAM, or in some other storage area. When the primary data is later read from primary storage (1210), the data verification filter (284) can calculate the CRC of the data received from the storage device (220) and compare that new CRC to the corresponding CRC (1220) stored in memory. If the stored and new CRC's match, then the data is verified. If the stored and new CRC's do not match, then the data verification filter (284) can indicate that the data received from the storage device (220) is invalid.

The data verification filter (284) could pass on delete notifications (260) without taking other actions. If a delete notification (260) applies to a region of primary storage (1210) that corresponds to stored CRCs (1220), then the stored CRCs (1220) can get out of sync with the primary data. That would likely not affect the integrity of the CRCs (1220) because there would be no reason for the CRCs (1220) corresponding to the deleted primary data to be read in the future. However, space in the CRC table (1230) is often quite limited, especially when the CRC table (1230) is stored in RAM. For example, in some implementations the CRC table (1230) may be limited to a small percentage or fixed amount of available RAM space. Thus, it can be advantageous for the data verification filter (284) to determine whether CRCs (1220) in the CRC table (1230) correspond to data in primary storage (1210) covered by a delete notification (260), and if so the data verification filter (284) can delete the corresponding CRCs (1220).

If the data verification filter (284) receives a delete notification (260) that applies to the entire storage device (220), then the data verification filter (284) can cancel ongoing operations, throw away all CRC's for the storage device (220), and start operating from scratch.

9. Port Driver

The port driver (288) can communicate with the data verification filter (284) above it and the storage device (220) below it to receive and pass on delete notifications (260) and read/write requests and data (235). This communication with the storage device (220) can be done using an existing or new protocol, such as by having a delete notification function in the existing ATA protocol. If a delete notification (260) is for a range that is greater than a maximum range that can be represented in a single delete notification protocol command, the port driver (288) can issue multiple delete notification protocol commands with adjacent ranges. If the port driver (288) receives a delete notification that applies to the entire storage device (220), then the port driver (288) can treat that delete notification the same as other delete notifications because the port driver's operations do not involve caching or transforming data. If the protocol to communicate with the storage device (220) does not include the ability to indicate that a delete notification (260) applies to the entire range of the storage device (220) (for example, with a flag), then the port driver (288) can modify the existing delete notification (260) that applies to the entire device (220) by generating one or more delete notifications (260) with one or more adjacent ranges that describe the entire range of the storage device (220).

Enhanced Techniques Using Delete Notifications

A. Modifying Delete Notifications in a Storage Stack

Figure 13:
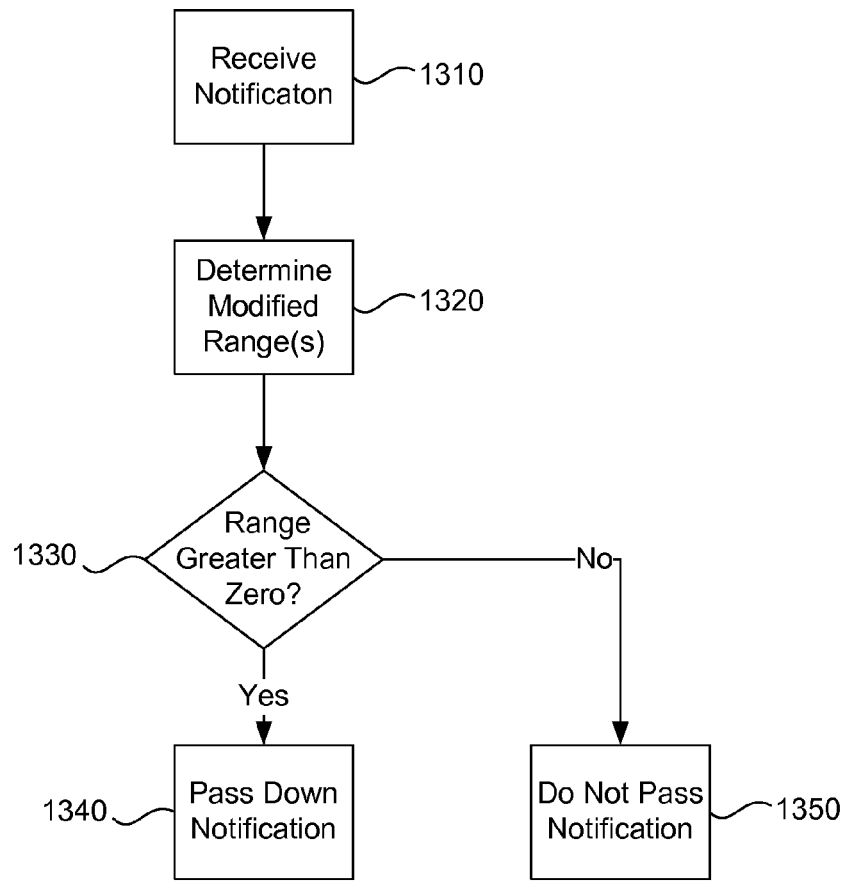
FIG. 13 is a flowchart illustrating a described technique for modifying an existing delete notification.

Referring to FIG. 13, a technique for modifying existing delete notifications is illustrated. This and other techniques discussed below can be performed using the computing environment and components described above or using some other environment and/or components. An existing delete notification can be received (1310). The delete notification can be received from a first storage stack component in a storage stack, and can be received at a filter that is below the first storage stack component. Upon receiving the delete notification, the storage stack filter can determine (1320) one or more modified ranges of data. For example, the one or more modified ranges can be expanded or contracted ranges, and contracted ranges can be zero ranges or ranges greater than zero. As another example, the one or more modified ranges may be converted ranges, such as where one or more ranges are converted from volume-relative range(s) to device-relative range(s). The first storage stack component from which the existing delete notification is received can be a hardware or software component in the storage stack, such as a filesystem or storage stack filter. The storage stack filter that receives the notification can determine (1330) whether one or more of the modified ranges of data includes a range greater than zero. If one or more of the ranges is greater than zero, then one or more modified delete notifications can be passed (1340) down the storage stack to a second storage stack component, with the one or more modified delete notifications indicating the one or more modified ranges of data. The second storage stack component can be a hardware or software component, such as a storage stack filter or a storage device. Moreover, if none of the modified ranges is greater than zero, the technique can include not passing (1350) modified delete notifications down the storage stack.

As an example, the storage stack filter can be a snapshot filter that can be configured to protect stored data, and the one or more modified ranges can be contracted to exclude one or more ranges of data protected by the snapshot filter. As another example, the storage stack filter can be a volume manager filter, and the one or more modified ranges can be expanded to include data in primary storage as well as corresponding data in redundant storage.

Figure 14:
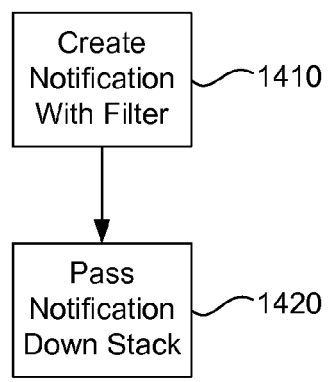
FIG. 14 is a flowchart illustrating a described technique for creating a new delete notification with a storage stack filter.

Referring now to FIG. 14, a general technique for creating a new delete notification is illustrated. The technique can include creating (1410) a new delete notification with a storage stack filter below a filesystem in a storage stack. The technique can also include passing (1420) the new delete notification down the storage stack to another storage stack filter. For example, the delete notification can indicate redundant data maintained by the first storage stack filter, such as redundant data maintained by a volume manager filter. As another example, the storage stack filter can be a snapshot filter, and the newly-created delete notification can cover snapshot data corresponding to a deleted snapshot. As yet another example, the storage stack filter can be a write aggregation filter, and the newly-created delete notification can cover data that has been drained from a log file maintained by the write aggregation filter.

B. Using Delete Notifications to Free Related Storage Resources

Figure 15:
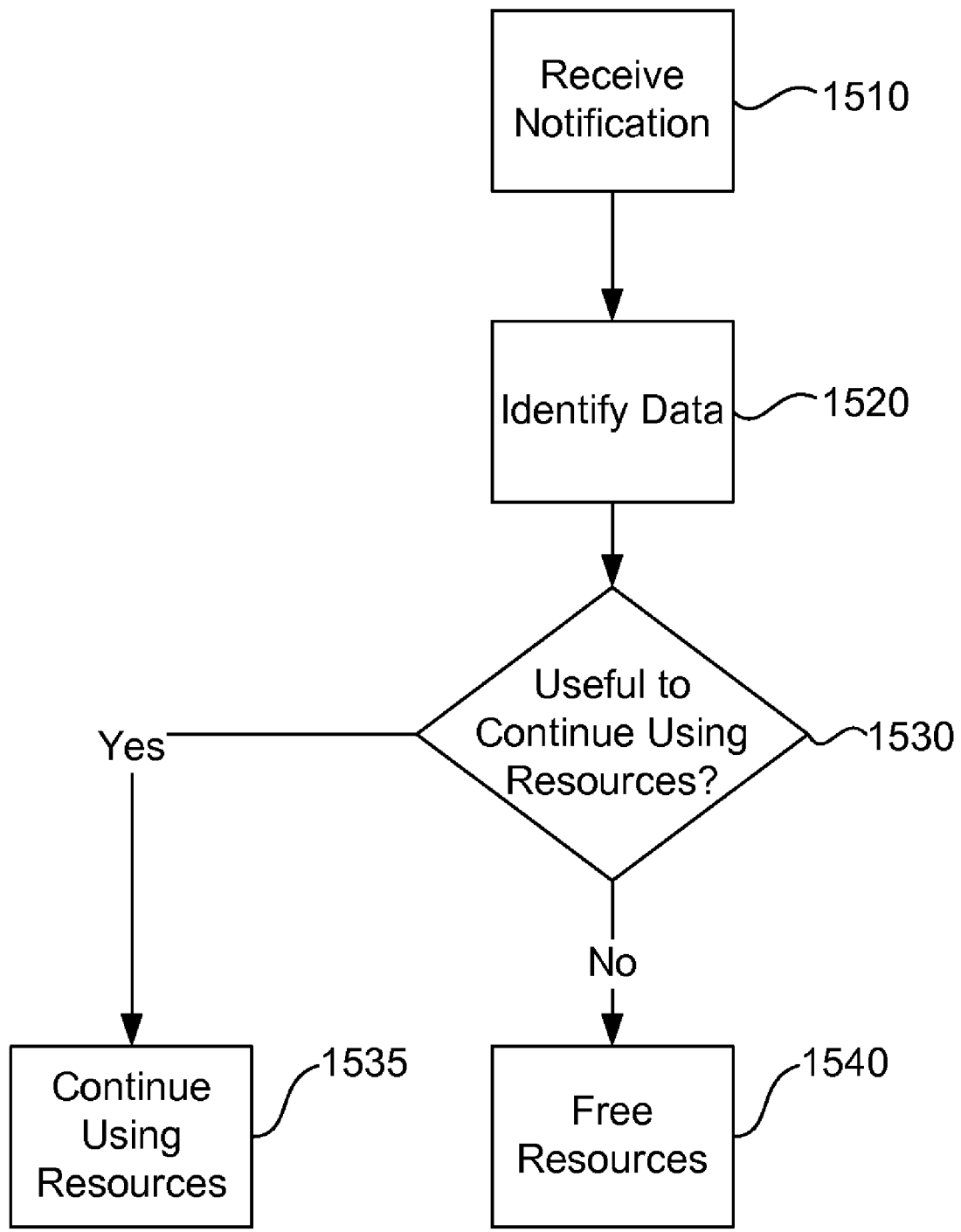
FIG. 15 is a flowchart illustrating a described technique for freeing resources in response to receiving a delete notification.

Referring to FIG. 15, a technique is illustrated for using a delete notification to free related storage resources. A storage stack delete notification can be received (1510) at a storage stack filter. The storage stack filter can identify (1520) secondary data that is related to primary data covered by the delete notification and is using current or planned storage resources. The storage stack filter can also determine (1530) whether having the data continue using the resources is useful. If so, then the storage stack filter can have the data continue (1535) using the resources. If not, then the storage stack filter can free (1540) the resources. For example, the storage resources can be one or more write operations, and freeing the resources can include canceling the write operations. As another example, the storage resources can be storage space, and freeing the resources can include deleting the secondary data to free the storage space. The primary data could be stored in the same volume as the secondary data, or the secondary data could be stored elsewhere, such as in RAM or in another storage volume.

Figure 16:
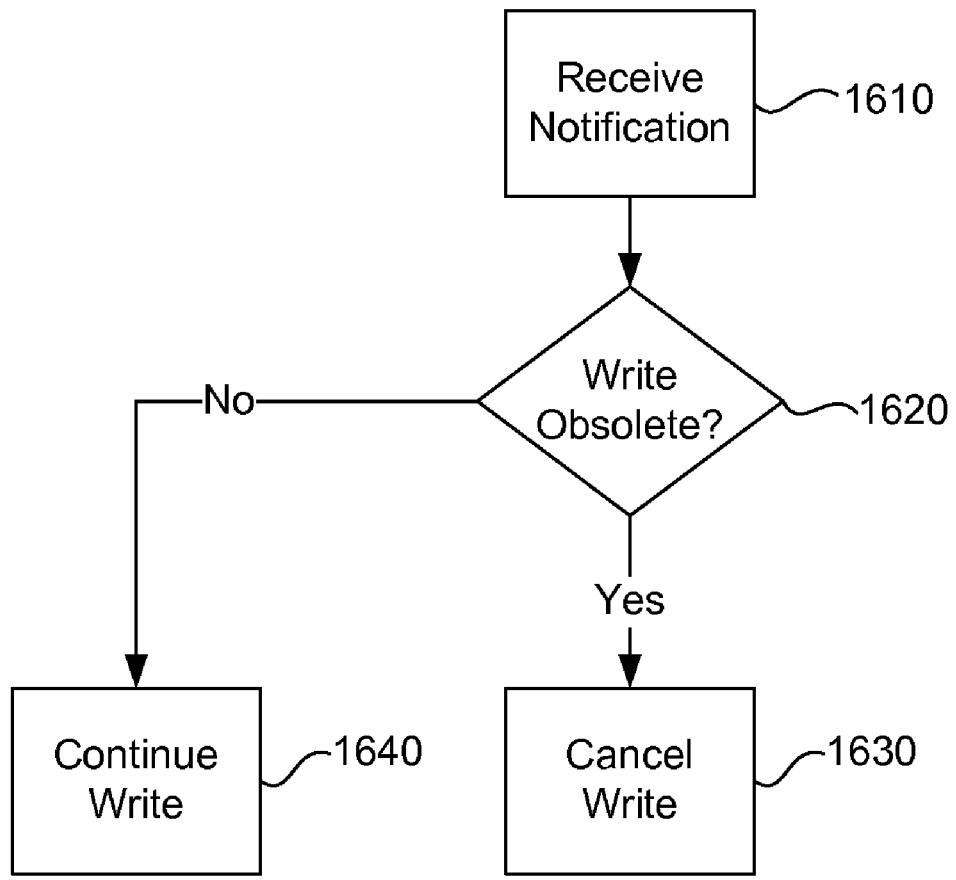
FIG. 16 is a flowchart illustrating a described technique for canceling an obsolete data write operation in response to receiving a delete notification.

Referring to FIG. 16, another technique is illustrated for using a delete notification to free related storage resources. A storage stack delete notification can be received (1610), and a storage stack filter can determine (1620) whether a write operation is rendered obsolete by the delete notification. If so, then the write operation can be cancelled (1630). If not, then the write operation can continue if the operation is ongoing, or continue to be planned if the operation is planned for the future (1640). The write operation could be, for example, part of a lazy write operation or part of a synchronization operation.

C. Delete Notifications for an Entire Storage Volume

Figure 17:
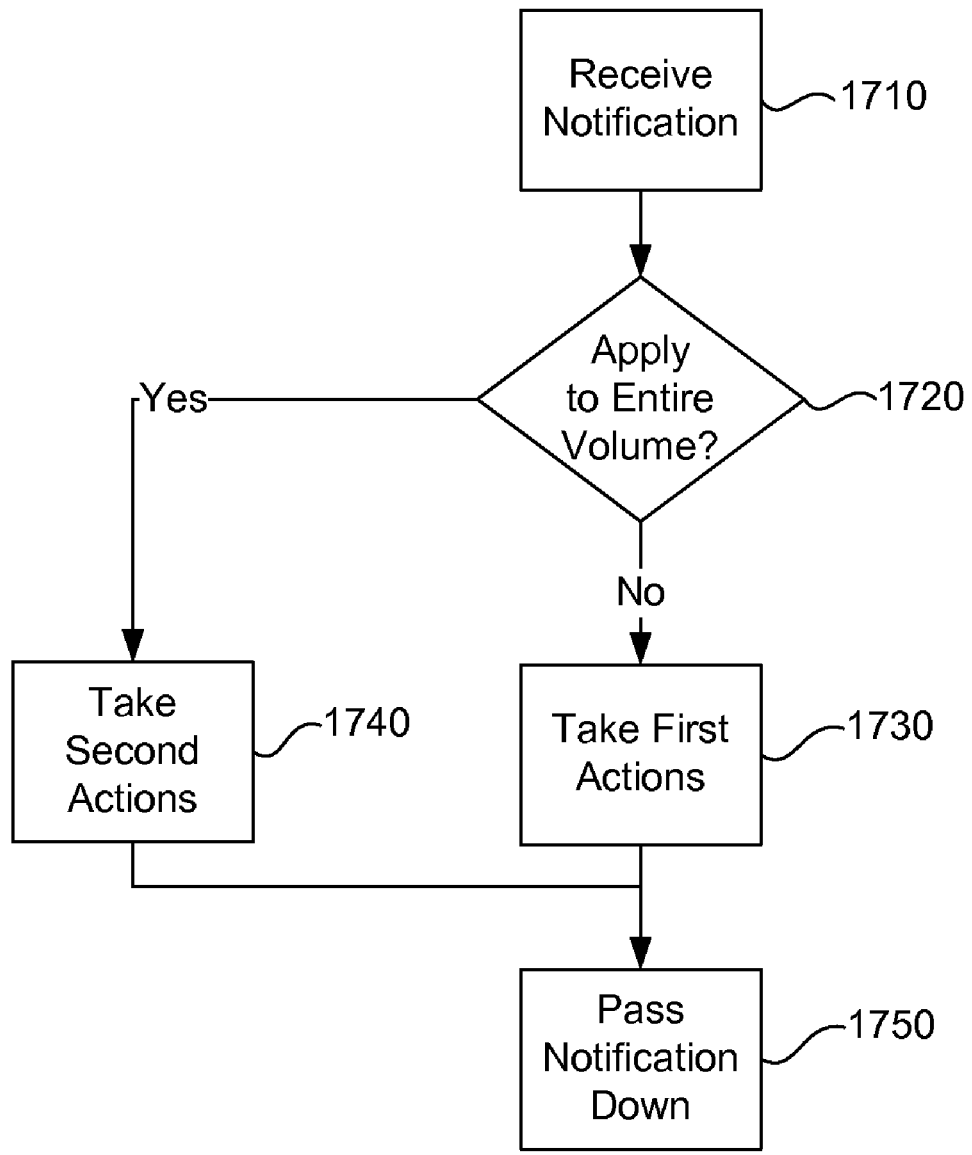
FIG. 17 is a flowchart illustrating a described technique for using a delete notification that may apply to an entire storage volume.

Referring to FIG. 17, a technique is illustrated using delete notifications that apply to an entire storage volume. A delete notification can be received (1710) at a storage stack filter in a storage stack. It can be determined (1720) whether the delete notification applies to an entire storage volume, such as by examining a flag in the delete notification. If the delete notification does not apply to the entire storage volume, the storage stack filter can take (1730) a first set of actions in response to the notification. If the delete notification does apply to the entire storage volume, then the storage filter can take (1740) a second set of actions in response to the notification. The notification can also be passed (1750) down the storage stack. This technique can be repeated for multiple storage stack filters in a storage stack. Such a notification, which applies to an entire volume, can be issued by a reformatting component that is able to reformat the volume or by some other component. The second set of actions can include actions such as disabling the filter and/or deleting unnecessary secondary data files. For example, the storage stack filter could include a snapshot filter and the second set of actions could include deleting all snapshots managed by the snapshot filter and disabling the snapshot filter. As another example, the storage stack filter could include a write aggregation filter, and the second set of actions could include disabling all lazy writes to the volume that are managed by the write aggregation filter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer system comprising:
   a filesystem in a storage stack;
   a storage device in the storage stack; and
   a storage stack filter between the filesystem and the storage device in the storage stack, the storage stack filter being configured to modify a delete notification, the storage stack filter comprising a write aggregation filter that is operable to store aggregated data in an aggregation location to be drained to one or more primary data locations at a later time, the delete notification indicating that a range of the aggregated data is invalid data, and the write aggregation filter being operable to respond to the delete notification by not draining data in the range of the aggregated data that is indicated as invalid data by the delete notification.

2. The system of claim 1, wherein the delete notification is a first delete notification and the storage stack filter is a first storage stack filter, and wherein the system comprises a second storage stack filter between the filesystem and the storage device in the storage stack, the second storage stack filter being configured to modify a second delete notification.

3. The system of claim 2, wherein the second delete notification is an existing delete notification and the second storage stack filter is configured to modify the existing second delete notification by receiving and modifying the existing second delete notification to produce a modified delete notification.

4. The system of claim 1, wherein the storage stack comprises a volume stack and a storage device stack.

5. The system of claim 2, wherein the second storage stack filter is further configured to pass the second delete notification to a storage stack component below the second storage stack filter.

6. The system of claim 2, wherein the second storage stack filter comprises a snapshot filter that is configured to store snapshot data, and wherein the second delete notification indicates a range of the snapshot data.

7. The system of claim 2, wherein the second storage stack filter comprises a snapshot filter that is configured to protect stored data, wherein the second delete notification is an existing delete notification, and wherein the second storage stack filter is configured to modify the existing second delete notification by receiving and modifying the existing second delete notification to exclude from the existing second delete notification data being protected by the snapshot filter.

8. The system claim 2, wherein the second storage stack filter comprises a snapshot filter that is configured to protect stored data and the second storage stack filter is further configured to:
  delete one or more snapshots managed by the snapshot filter;
  determine whether the data being protected by the snapshot filter still needs to be protected by the snapshot filter after the one or more snapshots is deleted; and
  if at least a portion of the data being protected by the snapshot filter no longer needs to be protected by the snapshot filter and is considered invalid data by the filesystem in the storage stack, then modify the existing second delete notification by creating the existing second delete notification and pass the existing second delete notification to a storage stack component below the snapshot filter, the existing second delete notification indicating the data that no longer needs to be protected by the snapshot filter and is considered invalid data by the filesystem.

9. The system of claim 2, wherein the second storage stack filter comprises a volume manager filter, the volume manager filter being configured to maintain primary data and redundant data, wherein the second delete notification is an existing delete notification, and wherein the volume manager filter is configured to modify the existing second delete notification by expanding a range of the primary data indicated by the existing second delete notification to further include a range of the redundant data that corresponds to the range of the primary data.

10. The system of claim 2, wherein the delete notification is an existing delete notification and the second storage stack filter is configured to:
  determine whether at least a portion of a range of data indicated by the existing second delete notification is needed by the second storage stack filter; and
  if at least a portion of the range of data indicated by the existing second delete notification is needed by the second storage stack filter, then contract the range of data indicated by the existing second delete notification to produce a modified delete notification that excludes the range of data needed by the second storage stack filter and pass the modified delete notification to a storage stack component in the storage stack below the second storage stack filter.

11. A computer-implemented method comprising:
  creating a new delete notification with a first storage stack filter that is positioned below a filesystem in a storage stack, the new delete notification indicating a range of deleted data, the first storage stack filter comprising a write aggregation filter that is operable to store aggregated data in an aggregation location to be drained to one or more primary data locations at a later time, and the range of deleted data including a range in the aggregation location from which aggregated data has been drained; and
  passing the new delete notification down the storage stack to a second storage stack filter.

12. The method of claim 11, wherein the aggregation location comprises a log file and the range in the aggregation location is a range in the log file.

13. The method of claim 11, wherein the filesystem views the range in the aggregation location from which aggregated data has been drained as containing valid data after the new delete notification is passed down the storage stack to the second storage stack filter.

14. The method of claim 11, further comprising sending the one or more new delete notifications to a storage device that comprises at least a portion of the aggregation location.

15. One or more computer-readable storage media containing one or more programs, the one or more programs comprising instructions that are executable by a computer system to perform acts comprising:
  a write aggregation filter in a storage stack draining data from one or more drained areas of an aggregation location to one or more final storage destinations;
  the write aggregation filter generating one or more new delete notifications identifying the one or more drained areas of the aggregation location; and
  the write aggregation filter sending the one or more new delete notifications down the storage stack.

16. The one or more computer-readable storage media of claim 15, wherein the aggregation location comprises a log file and the one or more drained areas of the aggregation location comprise one or more drained areas of the log file.

17. The one or more computer-readable storage media of claim 16, wherein the log file is a circular log file.

18. The one or more computer-readable storage media of claim 15, wherein a filesystem above the write aggregation filter in the storage stack views the drained areas of the aggregation location as containing valid data after the write aggregation filter sends the one or more new delete notifications down the storage stack.

19. The one or more computer-readable storage media of claim 15, wherein the acts further comprise sending the one or more new delete notifications to a storage device that comprises at least a portion of the aggregation location.

* * * * *